3,300,282
METHOD AND APPARATUS FOR HYDROGEN SULFIDE DETERMINATION
James B. Risk, Vancouver, British Columbia, and Francis E. Murray, Ladner, British Columbia, Canada, assignors to British Columbia Research Council, Vancouver, British Columbia, Canada
Filed Sept. 16, 1963, Ser. No. 308,938
9 Claims. (Cl. 23—232)

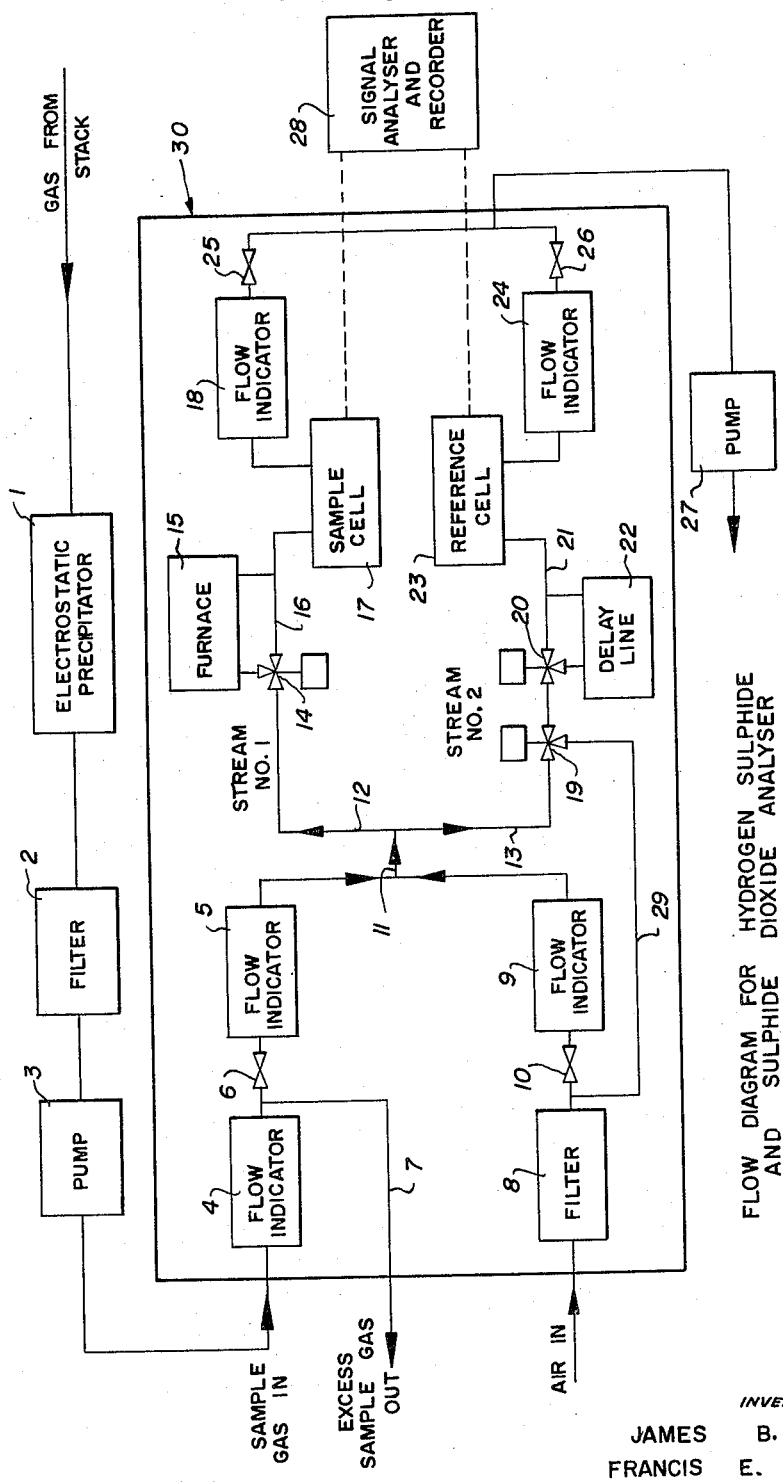

This invention relates to a novel process and apparatus for the determination of hydrogen sulfide.

More particularly, this invention relates to a method for the determination of hydrogen sulfide content in a sample gas stream which may contain a mixture of hydrogen sulfide and sulfur dioxide.

The determination of hydrogen sulfide content of gases is at present a serious problem in a number of industries Because of the malodour from this gas and the very high toxicity of hydrogen sulfide it is important to be able to detect minute quantities of it in the air. Although the obnoxious odour of hydrogen sulfide reveals its presence, the nose is not a reliable means for measuring concentration of the gas. In any event, reliable detection in the range of 0 to 500 p.p.m. is particularly important because of air pollution and also because this range covers the accepted upper limit for safety purposes. This places an extraordinary requirement on any system of detection to respond reproduceably and with certainty to small changes in concentrations.

Heretofore a number of attempts have been made to devise systems which will automatically and continuously measure the content of hydrogen sulfide in a gas, but such systems have been excessively complex or inadequate either because they do not give a quantitative result, or because they are inaccurate, or because they are not rapidly responsive to changes in concentration.

The present invention provides a process for continuously determining amounts of hydrogen sulfide as low as 7.5 p.p.m. in a sample gas stream containing a mixture of hydrogen sulfide and sulfur dioxide. The process of the invention is based on the fact that sulfur dioxide gas strongly absorbs ultraviolet radiation in the wavelength region of 2850 A. whereas the other components of the gas stream, including hydrogen sulfide, are very weak absorbers in this wavelength region. In accordance with the process, a stream of sample gas is diluted with air and the resultant mixture is split into two streams, the first stream being passed through a furnace in which the hydrogen sulfide present is catalytically oxidized to sulfur dioxide and then passed through the sample cell of a double beam ultraviolet analyser while the second stream proceeds directly and without change to the reference cell of the ultraviolet analyser. The difference in the sulfur dioxide content of the two streams is thus measured and since it is directly proportional to the hydrogen sulfide present in the original gas sample, the apparatus can be calibrated to read hydrogen sulfide directly.

The ultraviolet analyser has as a source of radiation a hydrogen lamp which is fitted with filters so as to transmitt a narrow band of radiation having a maximum intensity at 2850 A. The analyser is a commercial item available from Analytic Systems Co., Pasadena, California.

Further details of our invention are illustrated in the drawing which is a schematic illustration of the complete installation employing our invention.

Referring to the drawing, the apparatus of the invention is shown generally by the box 30. In order to analyze a stream of stack gas with the apparatus the gas is first passed through an electrostatic precipitator 1 and a micronic filter 2 in order to remove any particulate matter. The clean gas is then pumped through pump 3 into the analyzer through flow indicator 4 which measures the flow rate of the sample. A second flow indicator 5 is joined in series with flow indicator 4 and the second indicator measures the actual flow rate of sample gas being analyzed, this amount being controlled by a valve 6. The part of the initial sample which passes through flow indicator 4 and is not to be analyzed is ejected via excess sample gas line 7.

Air is introduced into the analyzer through filter 8 and is measured by flow indicator 9, the quantity of air to be used being controlled by valve 10. Generally valves 6 and 10 will be set so that an equal volume of gas passes through flow indicators 5 and 9. The air and gas samples are mixed in line 11 and the resultant mixture is split into two streams 12 and 13. Both of these streams contain air plus the original gas in the sample stream which includes the hydrogen sulfide which is of particular interest.

Stream 12 passes through a three-way control valve 14 which can permit hte gas stream to flow to the sample cell 17 either by way of furnace 15 or directly through line 16. To determine the concentration of sulfide present in the sample gas, stream 12 is passed through furnace 15 where the hydrogen sulfide is catalytically oxidized to sulfur dioxide in a stainless steel tube containing iron filings at a temperature between 200° C. and 250° C. The stream from the furnace 15, which now contains no hydrogen sulfide is then passed through the sample cell 17 in which the amount of ultraviolet radiation in the wavelength region of 2850 A. that is absorbed by the sulfur dioxide is measured. The gas sample leaves the sample cell 17 through flow indicator 18 and valve 25.

The second stream or mixed air and sample gas 13 passes through a pair of three-way valves 19 and 20 and may pass directly into the reference cell 23 of the ultraviolet analyzer by line 21 or may pass through the delay line 22. The purposes of this delay line is to give equal transit times for the gas streams between the mixing tube 11 and the absorption cells 17 and 23. The ultraviolet light absorption resulting from the sulfur dioxide in the second stream is measured in the reference cell 23.

The absorption of ultraviolet radiations by sulfur dioxide is directly proportional to the concentration of the sulfur dioxide. The analyzer compares the absorption occurring in the sample cell 17 and reference cell 23 and delivers a signal proportional to the difference in sulfur dioxide concentration in the two streams. Since this difference in the sulfur dioxide content of the two streams is directly proportional to the hydrogen sulfide content of the original sample gas, the signal from the analyzer can be fed to a recorder 28 calibrated to read hydrogen sulfide content directly.

The sample gas from analyzer 23 passes through flow indicator 24 and valve 26 after which it joins with the sample gas from valve 25 and is withdrawn from the apparatus by pump 27.

The instrument can also be used to determine sulfur dioxide content of a sample gas by by-passing furnace 15 through line 16 directly into sample cell 17 and then passing air through reference cell 23 via by-pass line 29. A direct reading of $SO_2$ content is then obtained.

Another alternative test method in accordance with the present invention comprises passing a sample gas through furnace 15 and sample cell 17 in the usual manner while passing air only through reference cell 23 by way of by-pass line 29. By this method it is possible to obtain a measure of the total sulfur content of the gas sample.

The range of the apparatus is variable from approximately 150 p.p.m. full scale deflection at maximum sensitivity to 2000 p.p.m. full scale deflection at a lower sensitivity level. At maximum sensitivity the apparatus is capable of detecting less than 7.5 p.p.m. of hydrogen sulfide and in general it can be stated that the minimum detectable amount of hydrogen sulfide is slightly less than 5% of full-scale deflection.

Likewise, the accuracy is slightly better than 5% of full-scale deflection.

What we claim as our invention is:

1. A method for the continuous determination of the proportion of hydrogen sulfide contained in a stack gas containing hydrogen sulfide and sulfur dioxide, which comprises removing any soilds from the stack gas, diluting said stack gas with air, dividing the stream of the air-gas mixture into a first and second stream, subjecting said first stream to catalytic oxidation in a furnace to convert the hydrogen sulfide to sulfur dioxide, irradiating said oxidized first stream with ultraviolet light at a wavelength of approximately 2850 A. and measuring the amount of radiation absorbed, irradiating said second stream with the same ultraviolet light and measuring the amount of radiation absorbed by said second stream, and determining the concentration of hydrogen sulfide in said gas from the difference in the amount of radiation absorbed by the two streams.

2. The method as claimed in claim 1 wherein the air and gas are mixed in approximately equal proportions by volume.

3. A method for the continuous determination of the proportion of hydrogen sulfide contained in a stack gas containing hydrogen sulfide and sulfur dioxide, which comprises removing any solids from the stack gas, diluting said stack gas with air, dividing the stream of the air-gas mixture into a first and second stream, subjecting said first stream to catalytic oxidation in a stainless steel tube containing iron filings in a furnace at a temperature from about 200° to about 250° C. to convert the hydrogen sulfide to sulfur dioxide, irradiating said oxidized first stream with ultraviolet light at a wavelength of approximately 2850 A. and measuring the amount of radiation absorbed, irradiating said second stream with the same ultraviolet light and measuring the amount of radiation absorbed by said second stream, and determining the concentration of hydrogen sulfide in said gas from the difference in the amount of radiation absorbed by the two streams.

4. A method for the continuous determination of the proportion of hydrogen sulfide contained in a stack gas containing hydrogen sulfide and sulfur dioxide, which comprises regulating a flow of stack gas from which all solids have been removed and directing said flow of gas to a mixing chamber, regulating the flow of air from which all solids have been removed and directing said flow of air to said mixing chamber, dividing the mixed gas and air from said chamber into first and second streams, subjecting said first streams to catalytic oxidation in a furnace to convert the hydrogen sulfide to sulfur dioxide, irradiating said oxidized first stream with ultraviolet light at a wavelength of approximately 2850 A. and measuring the amount of radiation absorbed, irradiating said second stream with the same ultraviolet light and measuring the amount of radiation absorbed by said second stream, and determining the concentration of hydrogen sulfide in said gas from the difference in the amount of radiation absorbed by the two streams.

5. An apparatus for the continuous determination of hydrogen sulfide in gases comprising:

(a) a conduit from a source of gas to be tested and including a gas flow regulator adapted to maintain a substantially constant rate of flow and means for removing solids from said gas, (b) a conduit from a source of air which also includes a gas flow regulator adapted to maintain a substantially constant rate of flow and means for removing solids from said air, (c) a mixing chamber to which both said conduits are connected and in which gases can be mixed, (d) a catalytic oxidation furnace connected by means of a conduit to said mixing chamber and in which hydrogen sulfide is catalytically oxidized to sulphur dioxide, (e) first and second absorption cells adapted to measure the adsorption of ultraviolet light of a wavelength of approximately 2850 A. by a sample gas, said first cell being connected by means of a conduit to said furnace and said second cell being connected by means of a conduit to said mixing chamber, and (f) an electronic device adapted to compare the amounts of ultraviolet light absorbed in said first and second cells.

6. The apparatus as claimed in claim 5 wherein the electronic device is adapted to give a continuous recording of hydrogen sulfide content based on a measurement of the difference between the amounts of ultraviolet light absorbed in each cell.

7. An apparatus for the continuous determination of the proportion of hydrogen sulfide contained in a stack gas containing hydrogen sulfide and sulfur dioxide, comprising a conduit from a source of stack gas to be tested and including means for removing solids from the gas and a gas flow regulator, a conduit from a source of air and including means for removing solids from the air and an air flow regulator, a mixing chamber to which both of said conduits are connected and in which said gas and air are mixed, a conduit extending from said chamber to a catalytic oxidation furnace to direct mixed gas and air to the latter, said furnace being adapted to catalytically oxidize hydrogen sulfide to sulfur dioxide, a first absorption cell connected to said furnace to receive gas therefrom and adapted to measure the absorption of ultraviolet light of a wavelength of approximately 2850 A. by the treated gas, a second absorption cell connected to the mixing chamber to receive mixed gas and air therefrom and adapted to measure the absorption of the ultraviolet light of a wavelength of approximately 2850 A. by the mixed gas and air, means for directing gas and air away from said first and second cells, and an electronic device adapted to compare amounts of ultraviolet light absorbed in said first and second cells.

8. Apparatus as claimed in claim 7 in which said electronic device is adapted to give a continuous recording of hydrogen sulfide content based on a measurement of the difference between the amounts of ultraviolet light absorbed in each cell.

9. Apparatus as claimed in claim 7 in which said furnace includes a stainless steel tube containing iron filings in which the hydrogen-sulfide is catalytically oxidized.

References Cited by the Examiner
UNITED STATES PATENTS

| | | | |
|---|---|---|---|
| 2,736,813 | 2/1956 | Cherrier | 250—43.5 |
| 2,874,298 | 2/1959 | Kindred | 250—43.5 |
| 3,026,184 | 3/1962 | Karasek | 23—255 |
| 3,076,697 | 2/1963 | Miller et al. | 23—232 X |

MORRIS O. WOLK, *Primary Examiner.*

H. A. BIRENBAUM, *Assistant Examiner.*